United States Patent [19]
Read

[11] Patent Number: 5,131,034
[45] Date of Patent: Jul. 14, 1992

[54] TELEPHONE SET FOR USE AS A DESK UNIT OR A WALL UNIT

[75] Inventor: Clifford D. Read, Stittsville, Canada

[73] Assignee: Northern Telecom Limited, Montreal, Canada

[21] Appl. No.: 574,881

[22] Filed: Aug. 30, 1990

[51] Int. Cl.[5] .............................................. H04M 1/00
[52] U.S. Cl. .................................... 379/435; 379/436; 379/455
[58] Field of Search ............... 379/435, 436, 447, 450; 374/426, 454, 455, 449, 446

[56] References Cited

U.S. PATENT DOCUMENTS

| | | | |
|---|---|---|---|
| 3,073,911 | 1/1963 | Mattke et al. | 179/100 |
| 3,557,322 | 1/1971 | Walden | 379/435 |
| 4,395,591 | 7/1983 | Kaczkos | 179/100 |
| 4,648,112 | 3/1987 | Sharp, Jr. | 379/435 |
| 4,710,596 | 12/1987 | Kurokawa | 379/435 |
| 4,768,225 | 8/1988 | Bloechl et al. | 379/435 |

FOREIGN PATENT DOCUMENTS

| | | | |
|---|---|---|---|
| 0138611 | 12/1978 | Japan | 379/435 |
| 0160758 | 8/1985 | Japan | 379/435 |

*Primary Examiner*—James L. Dwyer
*Assistant Examiner*—Jason Chan
*Attorney, Agent, or Firm*—Thomas Adams

[57] ABSTRACT

A telephone set which may be readily changed from a desk unit to a wall mounted unit without tools and without removing and re-installing any receiver-retaining parts or components has a handset with a receiver portion and a transmitter portion and a base with a transmitter portion receiving depression and a receiver portion receiving depression. An arm unit mounts within the receiver portion receiving depression. The arm unit has a pair of spaced apart side arms joined at one end by a transverse member. The arm unit has a pivotal mounting arrangement that enables the arm unit to move between a first position and a second position. In the first position, the set is used as a desk unit with the side arms at the sides of the receiver portion receiving depression and the transverse member is at the end of the receiver portion receiving depression nearer the transmitter portion receiving depression. In the second position the set is used as a wall unit with the side arms extending outwardly from the base. The space between the side arms is adapted for receiving the receiver portion when in the desk position. The side arms support the handset below the receiver portion when in the wall position. The ends of the side arms remote from the transverse member each have an inturned flange portion to aid in retaining the handset in the wall unit position.

21 Claims, 5 Drawing Sheets

TELEPHONE SET FOR USE AS A DESK UNIT OR A WALL UNIT

BACKGROUND OF THE INVENTION

This invention relates to a telephone apparatus, and in particular it relates to a telephone set which may be used for desk operation or wall-mounted operation.

For many years the telephone industry has recognized the desirability of providing a telephone substation apparatus, or more simply, a telephone set, which may be used as a desk unit or a wall unit. A number of designs of telephone sets have been developed which may be used as desk or wall units. The majority of these prior art telephone sets do not convert readily from a desk unit to a wall unit and vice versa. Many of the prior art telephone sets require a tool, such as a screw driver, to change from a desk to a wall unit, and many require the removal, addition or substitution of a part by the subscriber or user of the telephone set.

One such prior art telephone set is descried in U. S. Pat. No. 3,073,911-Mattke et al, issued Jan. 15, 1963. This telephone set has a base with depressions for receiving the transmitter portion and the receiver portion of a telephone handset. The actuator for operating the switching mechanism comprises a pair of spaced apart, cam-shaped plungers which are spring biased to project into the depression for receiving the receiver portion of the handset adjacent the bottom of the depression, that is, adjacent the end of the depression that is closer to the depression for receiving the transmitter portion. Between the spaced apart cam-shaped plungers is a fixed support which has two positions. This support has two arms, a flush arm and a hook arm. In one position the flush arm is flush with the surface between the plungers, that is, it is flush with the surface of the depression for receiving the receiver portion of the handset. In the other position, the hook arm projects between the cam-shaped plungers and conforms substantially to the shape of the projecting parts of the cam-shaped plungers. The fixed support is mounted to the base with a screw, and may be changed from one position to the other by removing the screw, reversing the position of the fixed support, and replacing the screw. When this telephone set is used as a desk unit, the fixed support is in the position with the flush arm outwards. The handset may be positioned on the base with the receiver portion and the transmitter portion of the handset in their respective depressions. The handset is thereby retained and the receiver portion of the handset presses the spaced plungers inwards to operate the switching mechanism. To convert the telephone set for use as a wall unit, the screw fastening the fixed support is removed, the fixed support is changed to its other position and the screw replaced. The hook arm is now projecting. The handset has a cavity adjacent the receiver portion for receiving the hook arm. When the handset is placed on the vertically mounted base, the hook arm is received in the cavity in the handset to retain the handset in position, and those portions of the handset on either side of the cavity engage the two cam-shaped plungers and press them inwardly to operate the switching mechanism. It will be seen that the changing of the telephone set from a desk to a wall unit requires the use of a screwdriver and the removal and reinstalling of a part at the edge of or adjacent the depression for receiving the receiver portion of the handset.

Another prior art telephone set is described in U. S. Pat. No. 4,395,591-Kaczcos, issued Jul. 26, 1983. The base of the telephone set has depressions to receive the receiver portion and the transmitter portion of the handset. A T-shaped retainer is mounted by a screw to the base adjacent the depression for receiving the receiver portion of the handset. The stem part of the T-shaped retainer is inclined so that the inclined stem part lies in and is substantially flush with the surface of the depression for receiving the receiver portion of the handset when the telephone set is used as a desk unit. When the telephone set is used as a wall unit, the screw is removed and the T-shaped retainer is reversed so that the inclined stem part projects and the screw is replaced. The projecting stem part fits into a cavity in the handset to retain the handset when the base is mounted on a wall. It will be seen that a screwdriver is required to convert the telephone from a desk unit to a wall unit and vice versa. Also a part adjacent the depression for receiving the receiver portion of the handset must be removed and replaced.

A further U.S. Pat. No. 4,768,225-Bloechl et al, issued Aug. 30, 1988, describes another from of telephone set capable of being used as a desk or a wall unit. In the arrangement disclosed in this prior patent, a filler or retainer is received in an opening in the base of a telephone set at the edge of a depression for receiving the receiver portion of the handset. This filler clips into its opening. The filler is removable and may be inserted in one of two positions. In one position the filler is flush with the edge of the depression for receiving the receiver portion of the handset. This position is suitable for using the telephone set as a desk unit. In the other position a wedge shaped part of the filler projects beyond the edge of the depression for receiving the receiver portion of the handset. In this position the wedge shaped part engage the receiver portion of the handset and retains the handset when the base is mounted on a wall. While the arrangement disclosed in this patent does not require a tool to change from a desk unit to a wall unit, it does require that a part be removed, reversed and re-installed.

Telephone sets that require a part to be removed and replaced provide an opportunity for losing or misplacing the part. The part must be removed and re-installed by the subscriber or user when converting or changing the set from a desk unit to a wall unit, and it is preferable to avoid this. This conversion is more complex than it need be.

An object of the present invention is to provide a simpler means of converting a telephone set from a desk unit to a wall unit and vice versa.

It is another object of the invention to provide a telephone set which may be used either as a desk unit or a wall unit and may be changed from one to the other without the removal or installation of any handset retaining parts.

SUMMARY OF THE INVENTION

According to one aspect of the present invention, a telephone set comprises a handset having a receiver portion and a transmitter portion, a base having at least a receiver portion receiving depression, the depression being defined by at least a pair of spaced apart side walls and a base wall, and an arm unit having a pair of substantially parallel, spaced apart side arms and a transverse member joining said side arms at one end thereof. The arm unit is mounted in said receiver portion receiving depression for pivotal movement between a first position with said transverse member adjacent said base wall and said side arms adjacent respective side walls, the receiver portion being received between the side arms and a second position with said side arms projecting from said base to extend either side of the handset and support the receiver portion.

Such first position adapts the telephone set for use as a desk unit and the second position adapts the telephone set for use as a wall unit.

Thus, the present invention provides a telephone set which may be used as a desk unit or a wall unit, and which is readily converted from one to the other. It does not require the removal and re-installing of a part which serves to retain the handset when the telephone set is used as a wall unit. It requires only the re-positioning of a component.

According to a second aspect of the invention, a telephone set base has depressions for receiving, respectively, the transmitter portion and the receiver portion of a handset, the depressions generally conforming to the shape of the respective transmitter and receiver portions. A pair of arms which, in a first position, are one either side of the depression for receiving the receiver portion of the handset, define the sides of the depression. The arms have a pivotal mounting means towards their inner ends, that is, towards the ends closer to the depression for receiving the transmitter portion of the handset. The arms may be pivoted to a second position projecting from the base substantially at right angles.

When the arms are in the first position, the telephone set is suitable for use as a desk unit. When the arms are in the second position, that is when the arms project, the telephone set is suitable for use as a wall unit. The handset may be placed on the vertically mounted base with the handset supported by the arms which extend on either side of the handset and urge the handset into position on the base.

According to another aspect of the invention there is provided a telephone set comprising a handset having a transmitter and a receiver portion, a base having a and a receiver portion receiving depression, said depression being defined by at least a pair of side walls and a base wall, an arm unit having a pair of substantially parallel side arms and a transverse member joining the side arms at one end thereof, the arm unit being mounted in the receiver portion receiving depression for pivotal movement between a first position with the transverse member adjacent the base wall and the side arms adjacent respective side walls, the receiver portion being received between the side arms and a second position with the side arms projecting from the base, to extend either side of the handset and support the receiver portion the first position adapting the telephone set for use as a desk unit and the second position adapting the telephone set for use as a wall unit.

BRIEF DESCRIPTION OF THE DRAWINGS

A preferred embodiment of the invention will now be described, by way of example only, with reference to the accompanying drawings, in which:

FIG. 7 is a simplified sectional side view of the arm unit of FIG. 5.

DETAILED DESCRIPTION OF THE PREFERRED EMBODIMENTS

Figure 1:
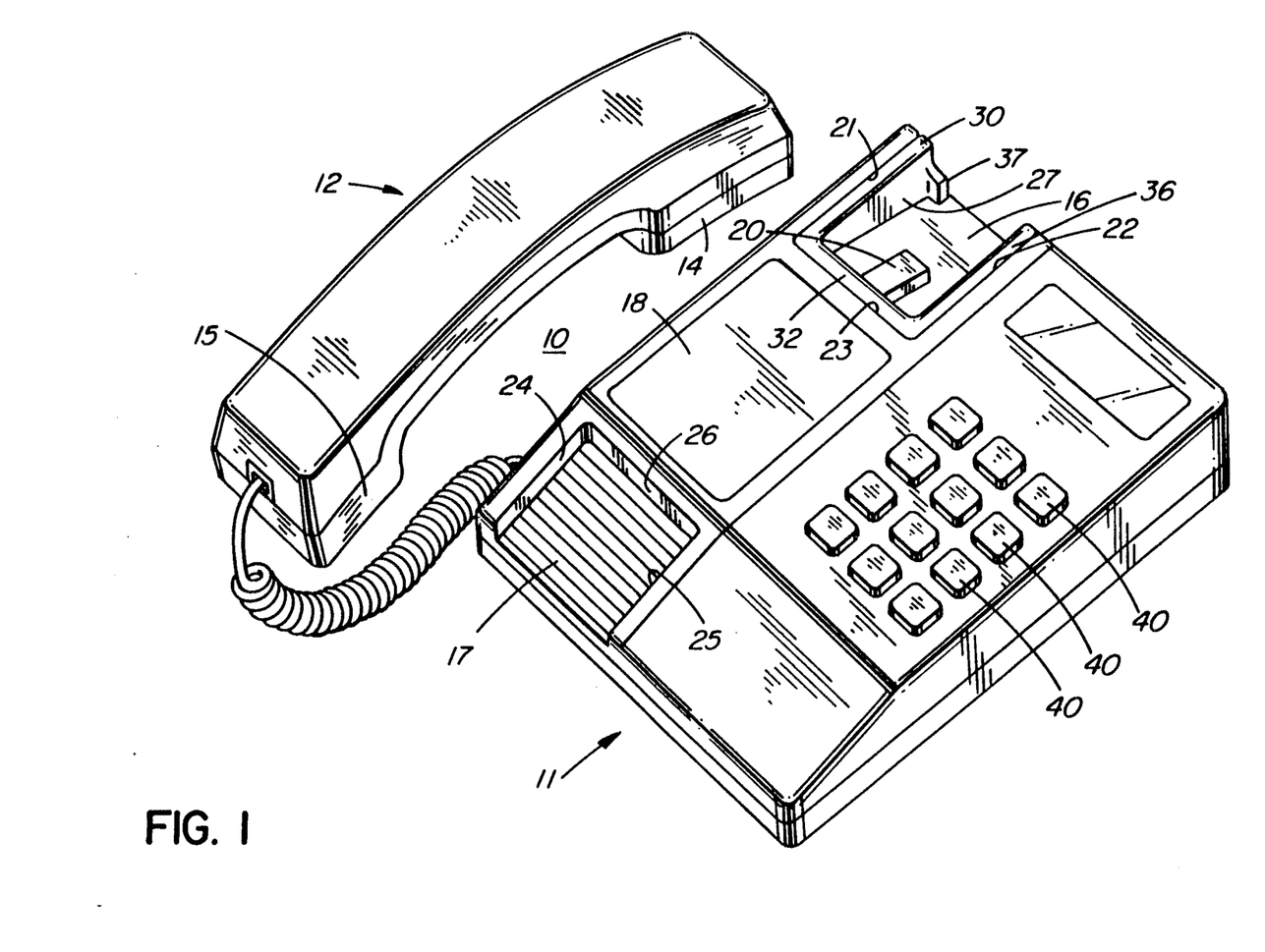
FIG. 1 is an isometric view of a telephone set according to the invention, suitable for use as a desk unit.

Referring to FIG. 1, a telephone set 10 has a base 11 and a handset 12. The handset 12 has a receiver portion or earpiece 14 and a transmitter portion or mouthpiece 15. The base 11 has a well or depression 16 which is adapted to receive the receiver portion 14 and a well or depression 17 which is adapted to receive the transmitter portion 15. The depression 16 is slightly larger than necessary to receive the receiver portion 14 in order to accommodate an arm unit as will be subsequently described. An intermediate portion 18 is between the two depressions 16 and 17. The bottom 19 of depression 16 is inclined as shown. In depression 16 there is an actuator button 20 which is spring biased to an outward position as shown. The actuator button 20 is connected with a switching mechanism (not shown) within base 11 as is known. When the handset 12 is placed on base 11 with the receiver portion 14 in depression 16 and the transmitter portion 15 in depression 17, the receiver portion 14 will depress the actuator button 20 and operate the switching mechanism as is known.

The depression 16 is defined by two spaced apart, substantially parallel, side walls 21 and 22. A base wall 23 extends from side wall 21 to side wall 22. The depression 16 is preferably open opposite the base wall 23 as is shown. Similarly, the depression 17 is defined by side walls 24 and 25 and a base wall 26. Depression 17 is also preferably open at the end opposite base wall 26. It will be apparent that the depression 17 need not necessarily have side walls, although this is preferred.

Mounted within depression 16 is an arm unit 27. This is best described with reference to FIGS. 1, 2 and 2A. The arm unit 27 has a pair of parallel side arms 30 and 31 with a transverse member 32 joining the side arms 30 and 31 at one end to form a generally U-shaped configuration. A pair of aligned pivot posts 33 and 34 project outwardly from respective side arms 30 and 31. The transverse member 32 preferably defines a plane with the outer edges 35 and 36 of side arms 30 and 31. The ends of side arms 30 and 31 may have inturned flange portions 37 and 38 useful in helping to retain a handset as will subsequently be described. The pivot posts 33 and 34 are received in bearing holes in side walls 21 and 22 (bearing hole 28 can be seen in side wall 21 in FIG. 2A). The arm unit 27 may be positioned with side arm 30 against recess side wall 21, with side arm 31 against recess side wall 22, and with the outer edges of arms 30 and 31 and the outer surface of transverse member 32 flush with the adjacent surrounding surface of base 11. The space now defined by the side arms 30 and 31 and the transverse member 32 is of a size for receiving receiver portion 14. It will be recalled that depression 16 was indicated as being sufficient to accommodate an arm unit 27 as well as the receiver portion 14. The position of arm unit 27 just described adapts the telephone set for use as a desk unit, that is, for use with the base 11 on a horizontal or substantially horizontal surface. This position is indicated in FIG. 2A by side arm 30D.

Figure 2:
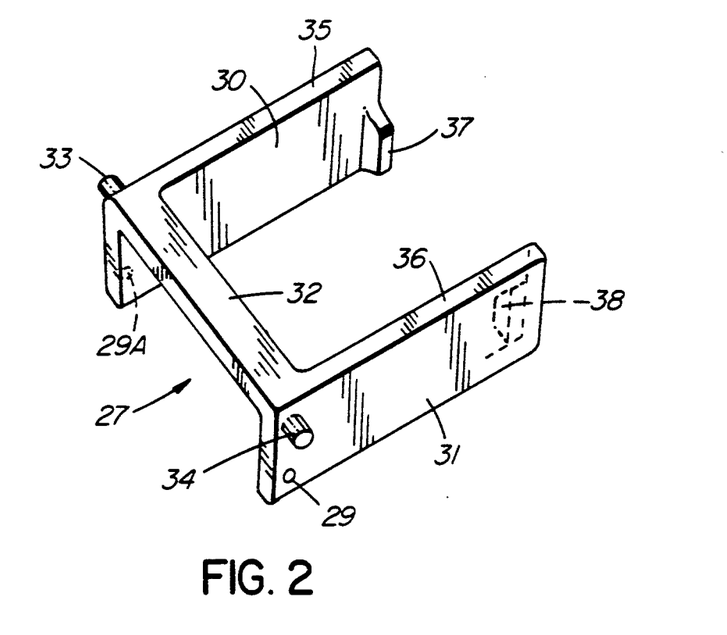
FIG. 2 is an isometric view of the arm unit of FIG. 1.
Figure 2A:
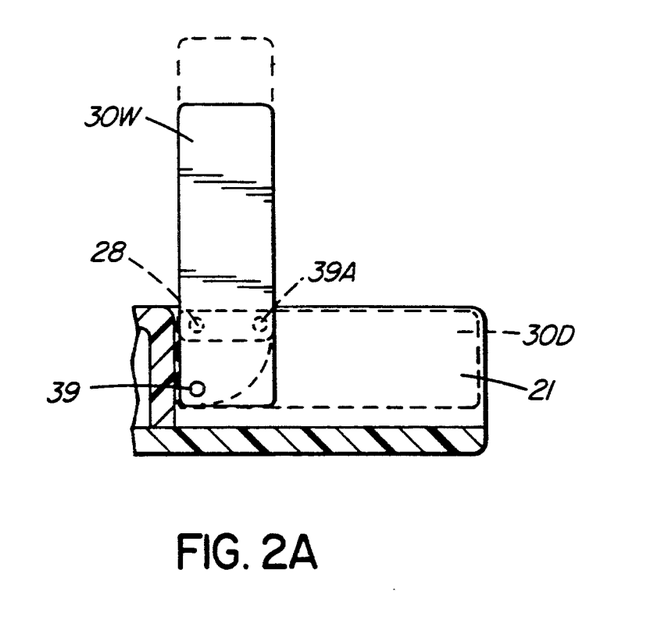
FIG. 2A is a simplified sectional side view of part of the end of a telephone base showing the arm unit in two positions.

As an aid in maintaining side arms 30 and 31 in the position just described for use as a desk unit, a small projection or bump 29 may be added on side arm 31 and a projection or bump 29A on side arm 30 (FIG. 2). A hollow or dent 39 in side wall 21 (FIG. 2A) receives projection 29A to retain the arm unit in position for use as a desk unit. There is another corresponding dent in side wall 22 (not shown) for receiving projection 29. A small extra force is required to initially move arm unit 27 when beginning to pivot arm unit 27 about pivot posts 33 and 34. FIG. 2A shows the second position of arm unit 27 where the side arms 30 and 31 project at substantially right angles to base 11. This position is indicated in FIG. 2A by the position 30W of the side arm. This position adapted the telephone set for use as a wall unit. It will be seen that there is a dent 39A in side wall 21 which receives projection 29A to assist in retaining the arm unit 27 in the extended position. A corresponding dent is provided in side wall 22.

The base 11 may contain other components such as a dialling mechanism represented by dialing push buttons 40, although this does not form part of the present invention.

Figure 3:
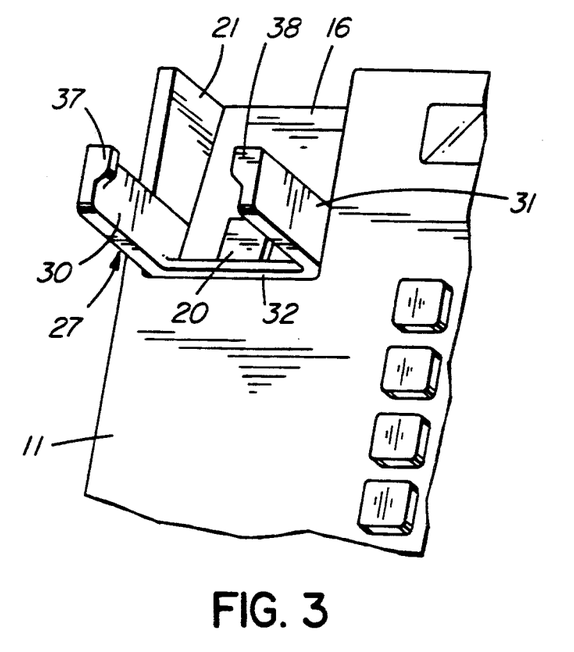
FIG. 3 is an isometric view of a part of a telephone set base with the arm unit in an extended position.
Figure 4:
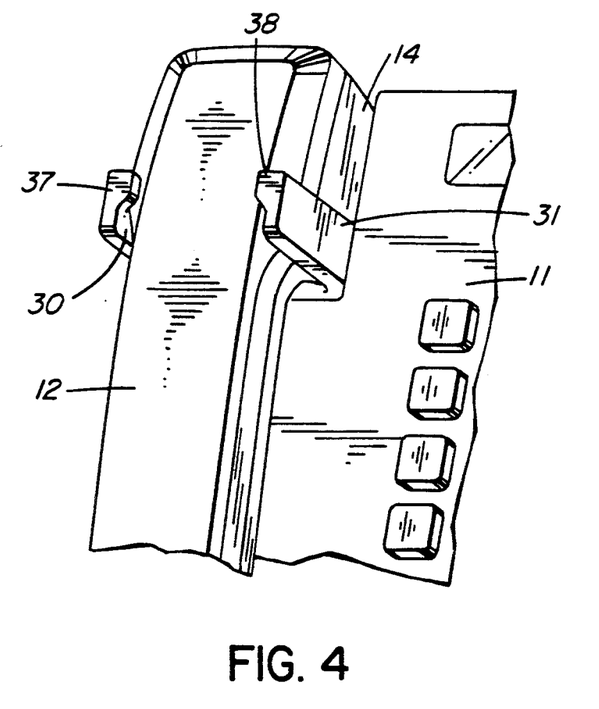
FIG. 4 is an isometric view of part of a telephone base and handset, according to the invention, arranged for use as a wall unit.

Referring to FIGS. 3 and 4, there are shown isometric views of a portion of the base 11 of a telephone set, and of a portion of handset 12. These views show the telephone set adapted for use as a wall unit, that is with the base 11 mounted to a vertical surface. The arm unit 27 has been pivoted by the subscriber or user from the first position or desk unit position to the second position or wall unit position. The handset 12 is placed in its rest position on base 11 by inserting the handset 12 between side arms 30 and 31 with the receiver portion 14 above the side arms 30 and 31, and then lowering the handset 12. The receiver portion 14 is supported by the side arms 30 and 31 and urged inwardly by flange portions 37 and 38. The receiver portion 14 engages the actuator button 20 to operate the switching mechanism. The transverse member 32 projects slightly above the outer surface of base 11 as shown in FIG. 3 to aid in retaining the handset 12 by engaging the lower edge of receiving portion 14 to aid in retaining the handset 12. The handset 12 is removed by raising it slightly off the side arms 30 and 31 and clear of flange portions 37 and 38, and then moving the handset outwardly.

Preferably the side arms 30 and 31 are of a material which is slightly flexible or pliant whereby the side arms may flex away from one another. Thus, if a subscriber or user should pull the handset 12 directly outwards without first raising it, the side arms 30 and 31 will readily bend or flex to permit this.

Figure 5:
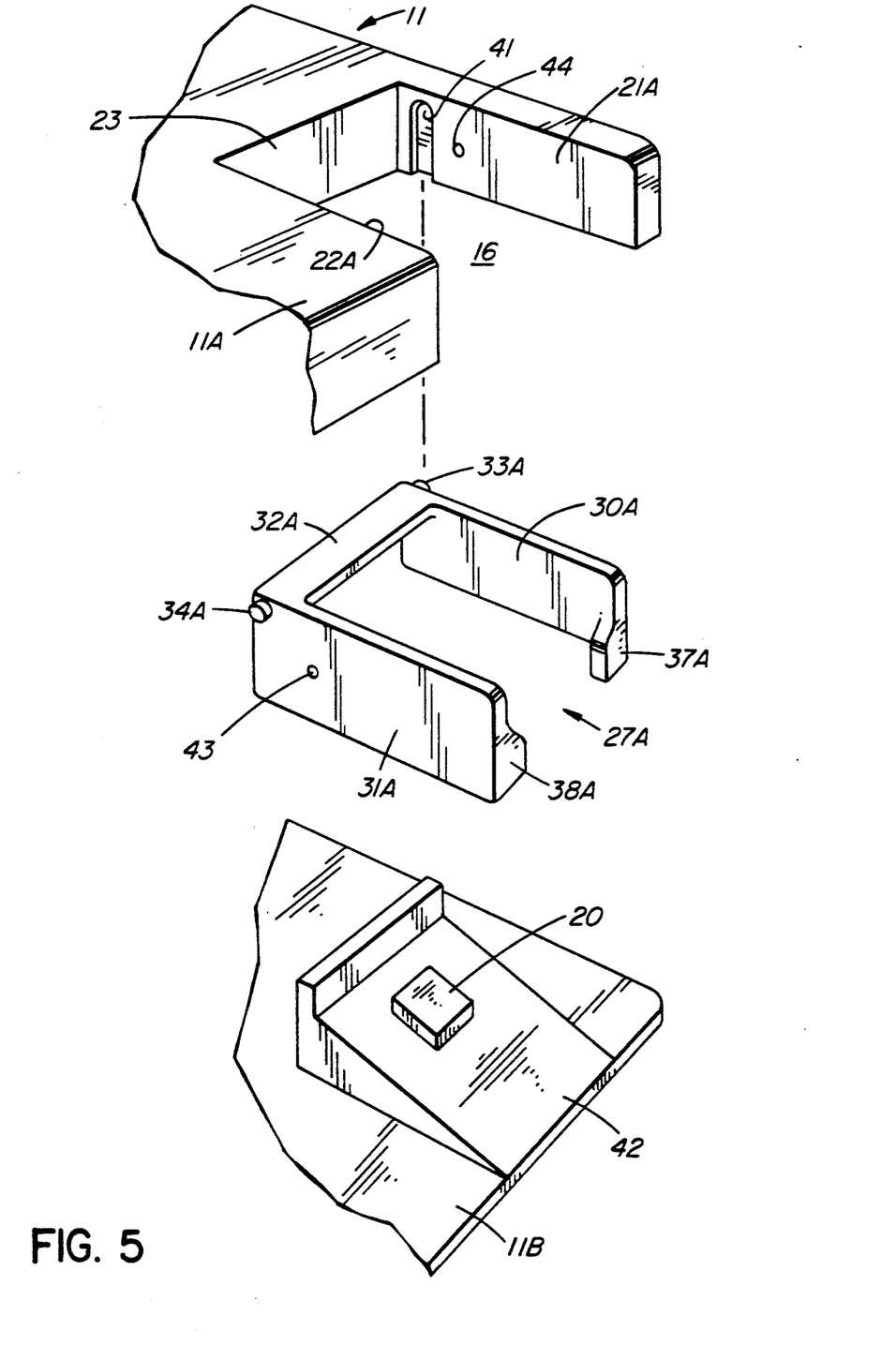
FIG. 5 is an isometric view of a portion of the base of a telephone set according to another form of the invention, with a base portion and the arm unit displaced for ease of illustration.

Referring now to FIG. 5, which is an exploded isometric view of another form of the invention, a telephone set base 11, is shown in two parts 11A and 11B and has an arm unit 27A. For ease of illustration, base part 11B and arm unit 27A are shown displaced. The depression 16 is shown defined by side walls 21A and 22A, and base wall 23. The side wall 21A has a slot 41 and there is a corresponding slot (not shown) in side wall 22A opposite slot 41. When base part 11B is positioned directly beneath base part 11A, the inclined surface 42 becomes the bottom surface of depression 16.

The arm unit 27A is similar to arm unit 27 (FIG. 2). It is mounted to base 11 with pivot post 33A in slot 41 and pivot post 34A in the corresponding slot (not shown) in side wall 22A. Side arm 31 A has a small bump or projection 43 on the outside surface, and there is a similar bump or projection (not shown) on the outside surface of side arm 30A. Side wall 21A has a small dent 44 suitable for receiving the projection (not shown) on the outside surface of side arm 30A. Similarly, side wall 22A has a dent (not shown) suitable for receiving projection 43. When the arm unit 27A is mounted to base 11, the side arms 30A and 31A are against respective side walls 21A and 22A. The projection 43 is received in its respective dent, and the opposite projection is received in dent 44, to aid in retaining the arm unit 27A in the position for use as a desk unit.

Figure 6:
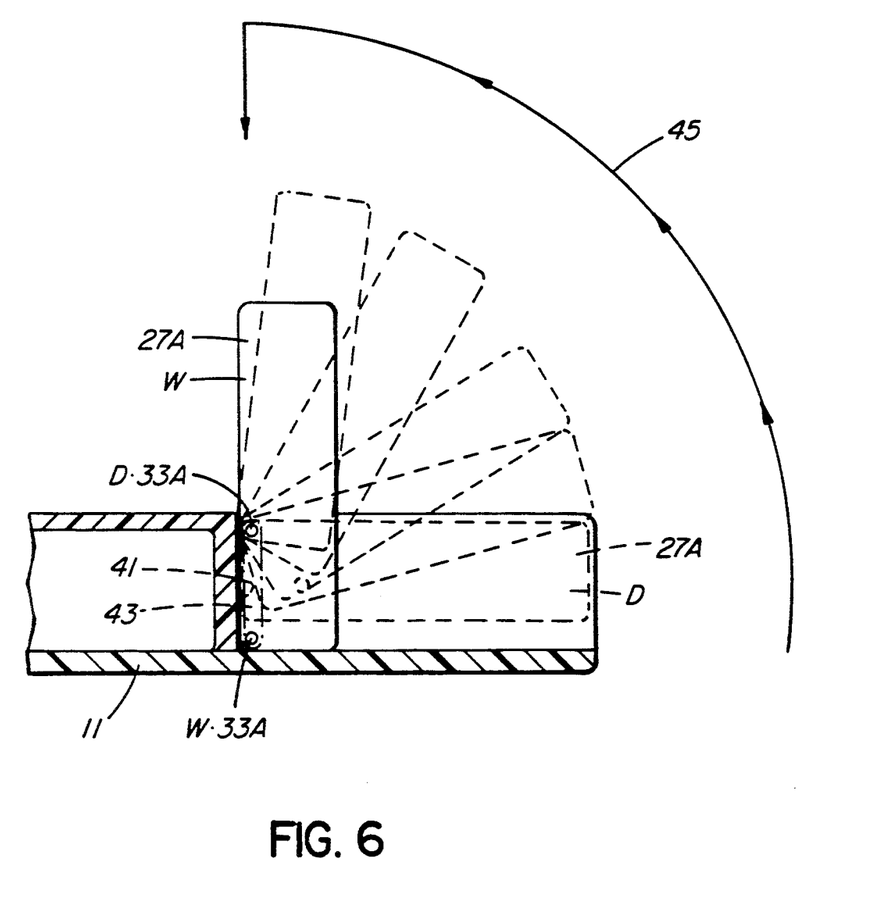
FIG. 6 is a schematic sectional side view of a part of a base of a telephone set.

Referring now to FIG. 6, there is shown in schematic form a sectional side view of a part of base 11 of a telephone set 10 illustrating pivoting of an arm unit 27A between its two positions of use, that is, for adapting the telephone set for use as a desk unit or a wall unit. When the telephone set is to be used as a desk unit, the arm unit 27A is in the position indicated by D. The pivot post 33A is in the position indicated by D.33A, that is at the outer extremity of slot 41. The projection opposite projection 32 is in dent 44 (FIG. 5). To change the telephone set for use as a wall unit, the arm unit 27A is pivoted about pivot post 33A by first overcoming the frictional forces resulting from the projections 43 being in respective dents 44. The pivotal movement is indicated by arrow 45. When arm unit 27A has been pivoted to a position where it extends outwardly from base 11 (at substantially 90 degrees from base 11), it is then pressed inwardly, again as indicated by arrow 45. The pivot post 33A slides along slot 41 to a position indicated by W.33A. In this position, where arm unit is represented by position W, the projection opposite projection 43 is again received in dent 44 to aid in retaining arm unit 27A in this position. In this position the telephone set is adapted for use as a wall unit.

It will be seen that a subscriber or user may readily change the position of the arm unit so that the telephone set may be used as a desk unit or a wall unit. No tools are required and no parts must be removed and no parts have to be re-installed at or adjacent the depression for receiving the receiver portion of the handset.

It is believed that the preceding description will provide an understanding of the invention and its operation. Various modifications and alternatives will, of course, be apparent to one skilled in the art. For example, although the specific embodiment has two depressions, one for the receiver portion and the other for the transmitter portion, it will be appreciated that some transmitter portions do not require a recess, in which case only the receiver receiving recess need be provided.

I claim:

1. A telephone set comprising a handset having a receiver portion and a transmitter portion, and a base having at least a receiver portion receiving depression, the depression being defined by at least a pair of spaced apart side walls and a base wall, and an arm unit having a pair of substantially parallel, spaced apart side arms and a transverse member joining said side arms at one end thereof, the arm unit being mounted in said receiver portion receiving depression for pivotal movement between a first position with said transverse member adjacent said base wall and each of said side arms adjacent a respective one of said side walls so as to receive said receiver portion of said handset between said side arms, and a second position with said side arms projecting from said base to extend one each side of, and support, said handset, said first position adapting said telephone set for use as a desk unit and said second position adapting said telephone set as a wall unit.

2. A telephone set as claimed in claim 1, wherein said arm unit is mounted by pivot means comprising a pivot receiving means on each said side wall of said receiver portion receiving depression adjacent said base wall thereof and pivot posts each projecting outwardly from a respective side arm adjacent said transverse member and adjacent the outer edge of the respective side arm when the arm unit is in said receiver portion receiving depression, each said pivot post being received in a respective pivot receiving means.

3. A telephone set as defined in claim 1, in which said side arms, at the ends thereof remote from said transverse member, have inturned flange portions for aiding in the retention of said receiver portion of said handset.

4. A telephone set as defined in claim 1, in which said side arms at the ends thereof remote from said pivot posts have inturned flanges for aiding in the retention of said receiver portion of said handset and said side arms are of a slightly pliant material to permit withdrawal of said handset directly outwards past said inturned flanges.

5. A telephone set as defined in claim 1 and further comprising position retaining means for aiding in retaining the arm unit in said desk unit position and in said wall unit position.

6. A telephone set as defined in claim 5, in which said position retaining means comprises a projection on an outer surface of said side arms and a respective dent in each side wall for receiving the respective projection when said arm unit is in said desk position and in said wall position.

7. A telephone set as defined in claim 1, in which said transverse member and outer edges of said side arms ion said desk unit position are flush with the surface of said base surrounding said receiver portion receiving depression.

8. A telephone set for use as a desk unit and a wall unit, comprising a handset having a receiver portion and a transmitter portion, a base having a receiver portion receiving depression, said depression having at least a pair of spaced, substantially parallel side walls and a base wall, pivot receiving means on each said side wall of said receiver portion receiving depression adjacent said base wall thereof, an arm unit having a pair of substantially parallel, spaced apart, side arms and a transverse member joining said side arms at one end thereof, the spacing of said side arms being such that said arm unit fits the receiver portion receiving depression with said side arms adjacent respective side walls thereof, and pivot posts on each said side arm projecting outwardly from the respective side arm adjacent said transverse member and adjacent an outer edge of the respective side arm when the am unit is in said receiver portion receiving depression, each said pivot post being received in a respective pivot receiving means for pivotally mounting said arm unit for movement between a desk unit position with said base on a substantially horizontal surface and with said side arms within said receiver portion receiving depression whereby said receiver portion of said handset is received between said side arms, and a wall unit position with said base mounted to a vertical surface and with said side arms projecting outwardly from said base whereby said handset is supported by said projecting side arms with said receiver portion within said receiver portion receiving depression.

9. A telephone set as defined in claim 8, in which said pivot receiving means comprises a bearing hole for receiving a respective one of said pivot posts, said arm unit being moved pivotally about said pivot posts in respective bearing holes between said desk unit position and said wall unit position.

10. A telephone set as defined in claim 8, in which said pivot receiving means comprise a slot in each said side wall extending from a bottom of said receiver portion receiving depression to adjacent a top of the respective side wall, said pivot posts being in a respective slot adjacent the top of the respective side wall in a desk unit position and being pivotally movable to a position with said side arms extending outwardly and then being slidably movable inwardly to a wall unit position with said pivot posts in their respective slot adjacent the bottom of said receiver portion receiving depression.

11. A telephone set as defined in claim 8, in which said side arms, at the ends thereof remote from said pivot posts, have inturned flange portions for aiding in the retention of said receiver portion of said handset.

12. A telephone set as defined in claim 9, in which said side arms, at the ends thereof remote from said pivot posts, have inturned flange portions for aiding in the retention of said receiver portion of said handset.

13. A telephone set as defined in claim 10, in which said side arms, at the ends thereof remote from said pivot posts, have inturned flange portions for aiding in the retention of said receiver portion of said handset.

14. A telephone set as defined in claim 10, in which said side arms at the ends thereof remote from said pivot posts have inturned flanges and said side arms are of a slightly pliant material to permit withdrawal of said handset directly outwards past said inturned flanges.

15. A telephone set as defined in claim 9, in which said side arms at the ends thereof remote from said pivot posts have inturned flanges and said side arms are of a slightly pliant material to permit withdrawal of said handset directly outwards past said inturned flanges.

16. A telephone set as defined in claim 10, in which said side arms at the ends thereof remote from said pivot posts have inturned flanges and said side arms are of a slightly pliant material to permit withdrawal of said handset directly outwards past said inturned flanges.

17. A telephone set as defined in claim 8 and further comprising position retaining means for aiding in retaining the arm unit in said desk unit position and in said wall unit position.

18. A telephone set as defined in claim 17 in which said position retaining means comprises a projection on an outer surface of said side arms and a respective dent in each side wall for receiving the respective projection when said arm unit is in said desk position and in said wall position.

19. A telephone set as defined in claim 8 in which said transverse member and outer edges of said side arms in said desk unit position are flush with the surface of said base surrounding said receiver portion receiving depression.

20. A telephone set as defined in claim 8 in which said transverse member in said wall unit position projects above an edge of said receiver portion receiving depression for engaging an edge of said receiver portion to aid in retaining said handset.

21. A base for a telephone set comprising a handset having a receiver portion and a transmitter portion, said base having a receiver portion receiving depression, the depression being defined by at least a pair of spaced apart side walls and a base wall, and an arm unit having a pair of substantially parallel, spaced apart side arms and a transverse member joining said side arms at one end thereof, the arm unit being mounted in said receiver portion receiving depression for pivotal movement between a first position with said transverse member adjacent said base wall and each of said side arms adjacent a respective one of said side walls so as to receive said receiver portion between said side arms, and a second position with said side arms projecting from said base to extend one each side of said handset and support said receiver portion, said first position adapting said telephone set for use as a desk unit and said second position adapting said telephone set as a wall unit.

* * * * *